INVENTOR.
Hans O. Schjolin
BY
T. L. Chisholm
ATTORNEY

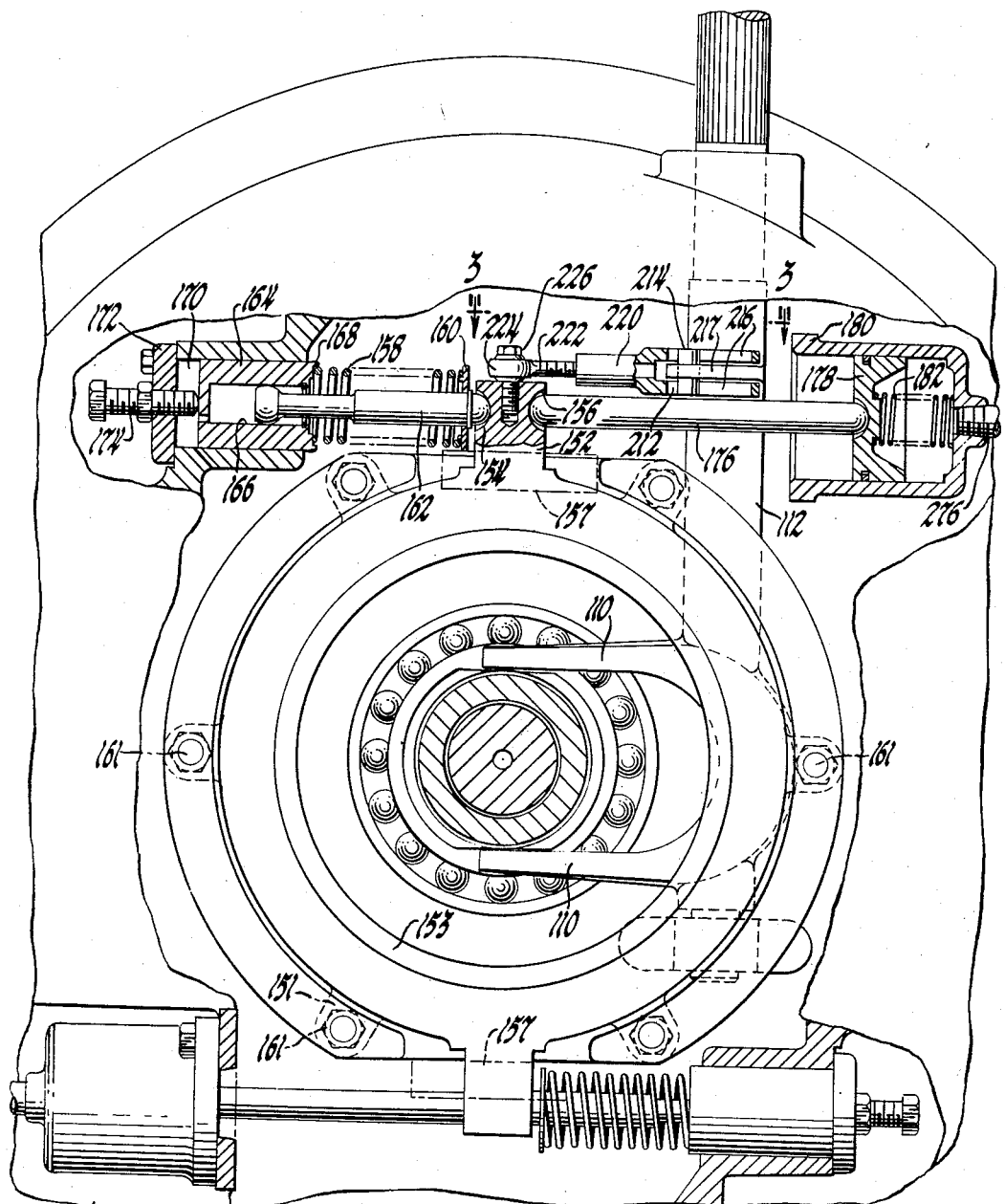

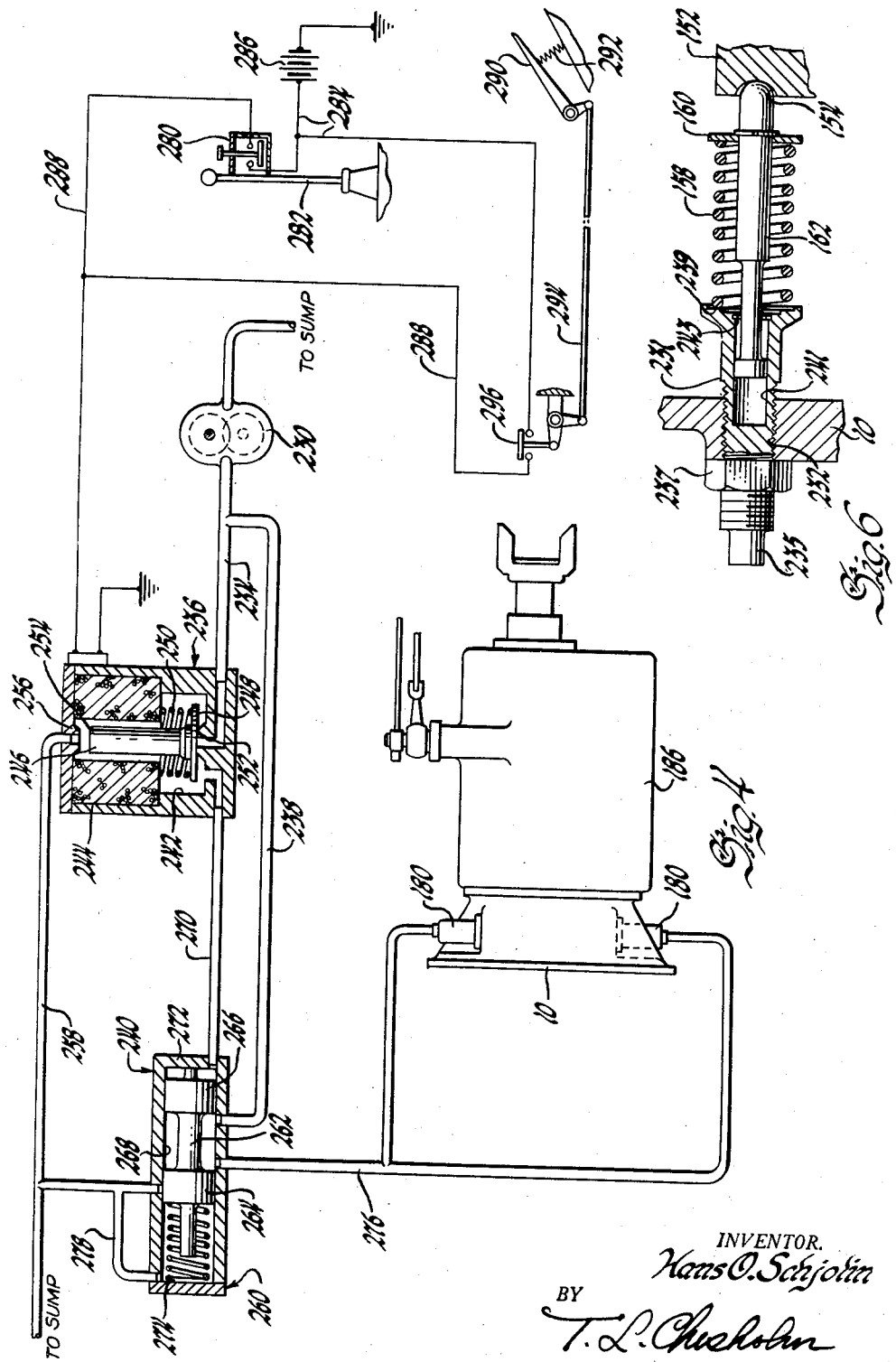

Nov. 25, 1958
H. O. SCHJOLIN
2,861,482
TRANSMISSION
Filed Jan. 19, 1955
4 Sheets-Sheet 4
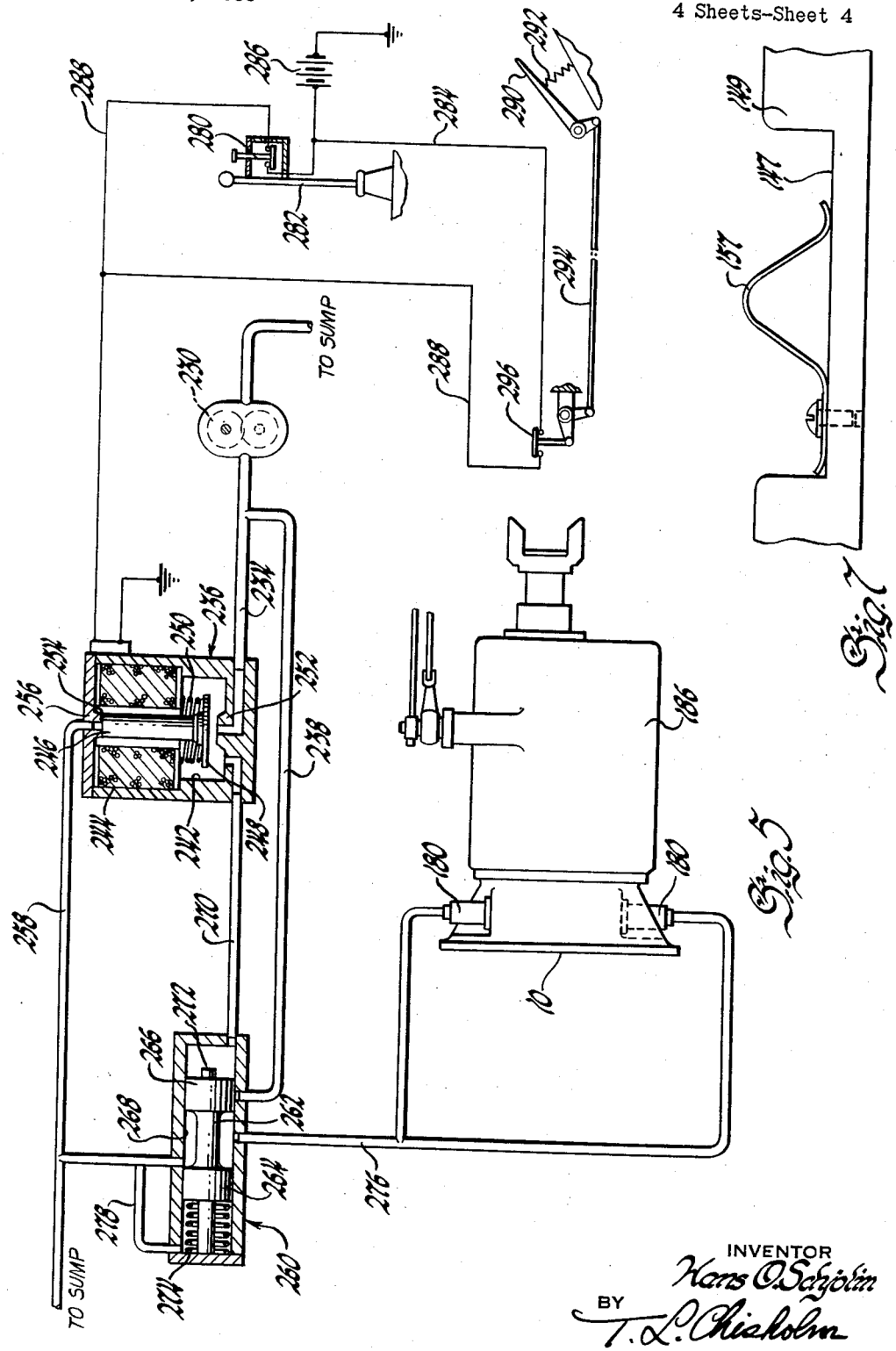
INVENTOR
Hans O. Schjolin
BY
T. L. Chisholm
ATTORNEY United States Patent Office 2,861,482
Patented Nov. 25, 1958

2,861,482

TRANSMISSION

Hans O. Schjolin, Birmingham, Mich., assignor to General Motors Corporation, Detroit, Mich., a corporation of Delaware Application January 19, 1955, Serial No. 482,792

28 Claims. (Cl. 74—781)

This invention relates to a two-speed transmission unit and particularly a main clutch and two-speed transmission unit employed in conjunction with a multi-speed transmission.

The two-speed transmission unit is located in the conventional clutch housing located between the engine and the main transmission. The drive from the engine is connected through the clutch driving plates mounted on the fly-wheel to the clutch driven plates which are connected to the carrier of the two-speed planetary gear set of the transmission unit. The ring gear is connected to the transmission unit output shaft while the sun gear is connected by means of a brake to the frame and by means of a one-way clutch to the output shaft. When the brake is engaged to hold the sun gear, the planetary gear of the transmission unit is in overdrive and when the brake is released, the one-way clutch stops the sun gear from forwardly overrunning the output shaft to place the transmission planetary gear unit in direct drive having free-wheeling. When the main clutch is disengaged to permit manual shifting of the multi-speed sliding gear-type transmission employed with this two-speed transmission unit, a cone clutch is also actuated to engage and slow down or stop the rotation of the planetary gear set and particularly the output shaft in order to permit shifting the gears in the main sliding gear transmission, particularly the first and second gears which are not ordinarily provided with synchromesh cones. The overdrive brake is spring-engaged so that fluid pressure is not required for overdrive in order to provide the positive drive obtained in overdrive whenever the engine is not running. As soon as the engine is started and the controls are set for direct drive, the engine driven pump supplies fluid to the servo to release the brake and change the ratio to direct drive.

The transmission controls consist of a manual switch located on the gearshift lever and an accelerator controlled switch which is closed when the accelerator is closed, as during coasting. When either or both of the manual and accelerator switches are closed the solenoid valve is actuated to exhaust the servo motors to place the transmission unit in overdrive without freewheeling. The manual control for the two-speed unit may be employed to provide a direct drive and an overdrive in some or each gear ratio of the main transmission.

An object of the invention is to provide a multi-speed transmission and main clutch assembly compactly arranged and located in the conventional spacing between the engine and the main transmission.

Another object of the invention is to provide in a multi-speed transmission and main clutch assembly, a main clutch and synchronizing clutch control mechanism which will engage the synchronizing clutch whenever the main clutch is disengaged to slow down or stop the rotation of the gear assembly and driven shaft to permit the shifting of the main sliding gear-type transmission employed in conjunction with this transmission unit.

Another object of the invention is to provide in a multi-speed transmission and main clutch unit having a main clutch and a brake for an element for a planetary gear and a control mechanism adapted to release the main clutch and at the same time disengage the brake for an element of the planetary gear, if it is engaged, to permit shifting of the main transmission under all conditions of operation.

Another object of the invention is to provide in a multi-speed transmission unit normally maintained by a spring in overdrive relation, a control system effective when the engine is running and supplying fluid under pressure to the control system for shifting to direct drive or overdrive by actuating a manual control or an accelerator control.

These and other objects of the invention will be apparent from the following description of the preferred embodiments of the invention illustrated in the accompanying drawings.

Fig. 2 is a partial sectional view of Fig. 1 along line 2—2 with parts broken away in section to show details.

Fig. 3 is a partial sectional view of Fig. 2 along the line 3—3 showing the brake control linkage.

Figs. 4 and 5 are schematic control diagrams of the transmission control system with Fig. 4 showing direct drive and Fig. 5 showing overdrive.

Fig. 6 is a partial sectional view showing a modified brake actuating spring mounting.

Fig. 7 is a partial view showing the brake retraction spring.

Figure 1:
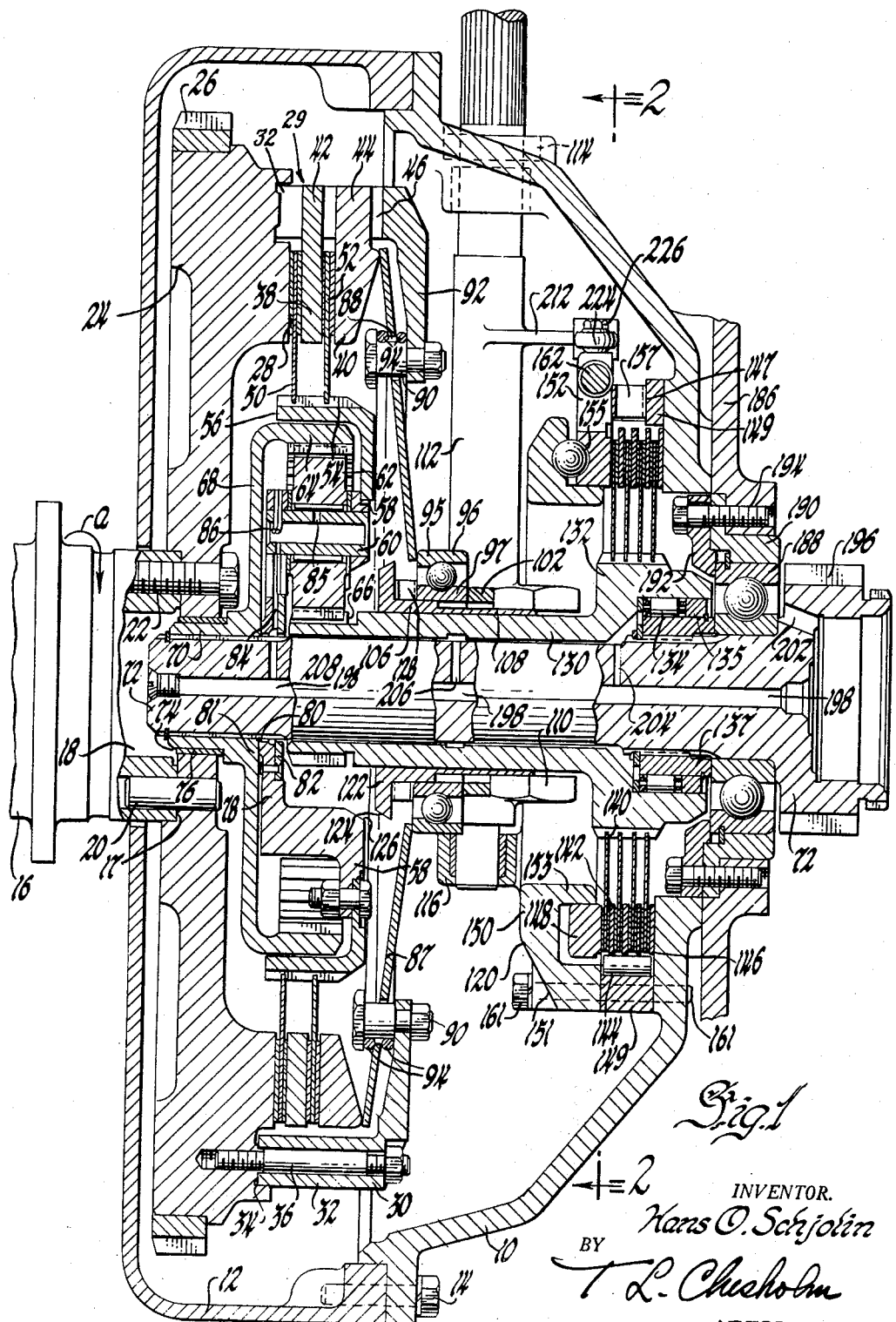
Fig. 1 is a sectional view of the transmission unit with certain parts broken away to show details.

This transmission unit provides a main clutch and a two-speed drive train between the engine and the conventional multi-speed transmission. The unit is located in the clutch housing 10 which has a flange at the forward end secured to the flywheel housing portion 12 of the engine by means of bolts 14. The engine shaft 16 has at the rear end an annular flat face 17 and a central bore 18. The flywheel 24 is seated on the flat face, located by pin 20 and secured by bolts 22 to the shaft. The flywheel also has at its outer periphery the conventional starting gear 26 and on its rear face a flat annular surface 28 which provides the fixed driving plate for the main clutch 29. The support 30 has annular portion 32 fitting in an annular groove 34 adjacent the outer perimeter of the flywheel 24 and is secured to the flywheel by studs 36 extending axially through the annular portion 32 and threaded in the flywheel. The intermediate clutch driving plate 38 is movably mounted within the support 30 adjacent the fixed clutch driving plate 28 on the flywheel. The clutch pressure driving plate 40 is movably mounted within the support 30 adjacent the intermediate plate. The intermediate clutch plate 38 has a plurality of radially extending ears 42 and the clutch pressure plate 40 has a plurality of radially extending ears 44 which fit into axial slots 46 in the annular portion 32 of the support 30 to permit limited axial movement and limit rotary movement.

The clutch driven plate 50 is located between the flywheel driving plate 28 and the intermediate driving plate 38 and the clutch driven plate 52 is located between the intermediate plate 38 and the pressure driving plate 40. The clutch driven plates 50 and 52 are connected by a suitable spline connection 54 to an annular drum 56 which forms a part of the planetary gear carrier structure 58. The carrier 58 has a plurality of sleeve shafts 60 carrying planetary pinions 62 which mesh with the ring gear 64 and the sun gear 66. The ring gear 64 has formed integrally therewith an annular supporting member 68 having an axial sleeve 70 which is suitably splined to the transmission input shaft 72. The sleeve 70 has an external cylindrical bearing surface 74 fitting within the bushing 76 which is located in the bore centrally located in the flywheel 24 to rotatably support shaft 72.

The carrier 58 has a portion 78 extending inwardly to the shaft 72 between the ring gear support 68 and the pinions 62. This annular carrier portion 78 has a forwardly extending shoe 80 engaging the rear face 81 of the ring gear support 68 and has an annular thrust washer 82 suitably secured by means such as rivets to the rear face adjacent the sun gear 66. The shoe 80 and rear face 81 provide one set of friction surfaces of the synchronizing brake. The carrier portion 78 has oil passages 84 extending radially into the sleeve shaft 60 to connect with radial holes 85 in the sleeve shaft to lubricate the planetary pinion bearings. The lubricating oil in the sleeve shaft 60 will flow out the open ends to lubricate the ring gear 64 and the clutch. The sleeve shaft 60 is fixed in position by suitable means such as pin 86.

The movable clutch plates 38 and 40 are actuated by an annular spring member or Belleville spring 87 which engages the movable pressure plate 40 at the outer perimeter and has intermediate its edges an annular series of apertures 88 for the studs 90 which are secured to an inner edge portion of the annular disc portion 92 of the support 30. The annular spring 87 is pivoted between a pair of wire rings 94 which are supported by the annular series of studs 90. The inner annular edge of the Belleville spring 87 engages the outer race 95 of the ball bearing thrust or throw out bearing 96. The inner race 97 and spacer ring 102 have internal cylindrical surfaces fitting on the synchronizing sleeve 106. The sleeve 106 has a pair of diametrically opposed flats 108 on each side of the sleeve 106 so that flat surfaces of the sleeve 106 fit between the parallel inner side surfaces of the tines of the shift fork 110. This prevents the sleeve 106 from rotating. Fork 110 is formed integrally with the clutch actuating shaft 112 which is suitably mounted in a bearing 114 formed in the outer wall of the transmission and clutch housing 10 and a bearing 116 suitably bolted to a rear brake supporting portion 120 of the housing 10. At the forward end of the sleeve 106 there is a radial flange 122 terminating in a conical cone brake surface 124 which cooperates with the conical cone brake surface 126 formed on the inner portion of carrier 58. These cone surfaces provide a portion of the synchronizing brake and are engaged when the main clutch fork moves the thrust bearing 96 forward to act through annular spring 87 to disengage the main clutch and at the same time acts through the annular undulated spring 128 to move sleeve 106 forward to engage the cone surfaces 124—126 and friction surfaces on shoe 80 and rear face 81 to slow or stop shaft 72 to facilitate gear shifting. Since the movement of the thrust bearing 96 is limited, the spring 128 is not completely compressed and limits the application pressure of the synchronizing brake.

The sleeve 106 is rotatably mounted on the sun gear sleeve 130 which is formed integrally with the sun gear 66 and is rotatably mounted on the shaft 72. To the rear of the clutch operating fork, the sun gear sleeve 130 has a portion 132 of increased diameter providing an annular space for the one-way sprag clutch 134 and annular bushing 135 located between the sleeve shaft 130 and the main output shaft 72. The one-way clutch will permit the output shaft 72 to overrun the sun gear sleeve shaft 130 for overdrive but will not permit the sun gear sleeve shaft 130 to overrun the output shaft and thus locks the shaft together to provide direct drive. The bushing 135 engages the sleeve shaft 130 and the inner race of the sprag clutch 137 which is keyed to the output shaft 72 to concentrically locate sleeve shaft 130 on shaft 72.

The sun gear shaft portion 132 has an external splined drive connection to the rotatable ratio change brake discs 140 located between fixed brake discs 142. The fixed discs 142 are secured in the annular support 149 by axially extending pins 144 extending through recesses in the support and the external perimeter of the fixed brake discs 142. A fixed brake abutment surface 146 is formed on the rear wall of housing 10 and a movable annular abutment or brake apply member 148 engages the other side of the brake disc assembly. A pair of cantilever leaf-type retraction springs 157 are secured by a screw to the recessed portion 147 of the annular support 149 and engage the apply ring 148 to urge the apply ring 148 away from the brake discs to release the brake. The brake apply ring 48 fits in an annular recess formed in the annular cam member 150 between an inner annular rim 153 and an outer annular rim 151 with opposed spaces for the ears 152 on apply ring 148. The cam 150 and the brake apply ring 148 have a pair of annular mating surfaces each having a plurality of rounded ramps 155 inclined in opposite directions and formed to receive a ball bearing in each opposed pair of ramps so that rotary movement of apply ring 148 relative to the cam 150 moves the two members away from each other so that the apply ring 148 engages the brake discs to apply the brake.

The apply ring 148 has a pair of diametrically opposed ears 152 for connecting the ring to the control mechanism, one of which is shown in Fig. 1. The brake support assembly 120, consisting of the annular support 149 located around the brake discs and the cam 150, is secured to the housing 10 by suitable bolts 161 or studs passing through the bosses on outer rim 151 and through members 149 to the housing 10. Referring to Fig. 2 the ear 152 has opposed recesses 154 and 156 located in opposite sides thereof facing in the plane of the apply ring 148. The brake is spring-applied by spring 158 which engages the ring 160 fixed to the rod 162 which engages at the same end the recess 154 in the ear 152. The other end of the rod 162 is located in a guide 164 which has a central bore 166 providing a guide for the rod 162 and an end surface 168 providing an abutment for the spring 158. A closure 172 is detachably secured in a suitable manner as by screws to the housing 10 over the bore 170. An adjustably mounted lock bolt 174 is threaded into the closure to adjustably position the guide 164 in the bore 170. The brake is pressure released by the rod 176, which engages the recess 156 in the ear 152, actuated by the servo motor consisting of the piston 178 operating in the cylinder 180. A spring 182 resiliently urges the piston into contact with the rod 176.

The transmission input shaft 72 is mounted in the normal transmission housing 186 and rotatably supported by the bearing 188 located in the annular bushing 190 in the front wall of the housing. A locking member 192 retains the bearing in the bushing and both of these elements are suitably fastened to the housing 186 by screws 194. The transmission input shaft 72 has immediately inside the transmission housing 186 the usual input gear 196. The clutch and two-speed transmission unit has a pressure lubricating system having a central lubricating bore 198 in shaft 72 supplied with oil under pressure from a suitable source. As shown in Fig. 1 the passage 198 is blocked adjacent the engine and open to transmission lubricating oil from the main transmission in housing 186. The passage 198 may also be blocked adjacent the gear 196 and supplied with oil from the engine shaft 16 or from an external source via a transfer bearing. Bore 202 supplies oil to the shaft bearing 188. Lubricating oil is supplied from the central bore 198 via branch bore 204 to the freewheeling element 134 and bushing 135, via branch bore 206 to the sun gear sleeve shaft 130 and the cone clutch sleeve shaft 106 and via branch bore 208 to the planetary gearing lubricating system. The oil from branch 208 enters passage 84 to sleeve shafts 60 where it flows via passages 85 to the planetary pinion bearings and flow out the ends of the sleeve shafts to lubricate the ring gears and clutch.

The manual control or main clutch operating shaft 112 is also connected by a linkage to provide an overcontrol for the brake apply mechanism in order to release the sun gear brake whenever the clutch is released. This linkage consists of an arm 212 fixed to the shaft 112. A pin 214 fixed transversely in the end to the arm 212 is slidably mounted in the slots 216 in the bifurcated end of the rod 220. The rod 220 has a threaded bore to receive a threaded end of the rod 222 which has an eye 224. A bolt 226 passes through the eye to secure the rod 222 to the ear 152. A suitable round universal bushing may be employed between the bolt and the eye to provide for the misalignment caused by axial movement during rotation of the cam 148.

A remote control employing electric controls to effect the operation of hydraulic servo motors as illustrated in Fig. 4 is employed to actuate the brake 140 of the two-speed transmission. A pump 230 driven by the engine and drawing fluid, i. e. oil, from a transmission or engine sump supplies the oil via line 234 to a solenoid valve 236 and via line 238 to a relay valve 240. Solenoid valve 236 is located in a sealed housing 242 and has a coil 244 and a central core 246 having a valve element 248 attached to its lower end and a valve surface 254 at the upper end. A spring 250 normally urges the core 246 out of the coil 244 and the element into engagement with the valve seat 252 to close the output line 234 from the pump. When the solenoid coil 244 is energized the core 246 is raised and the valve surface 254 on the upper end of the coil engages valve seat 256 to close line 258 to the sump, and at the same time raises element 248 to open the pump output line 234 to the valve chamber 242.

The relay valve 260 has a valve member 262 having two lands 264 and 266 of equal diameter connected by a body portion of lesser diameter. Solenoid valve chamber 242 is connected by the line 270 to one end of the valve bore 268 where the oil acts on the end face of land 266. An abutment 272 maintains the valve spaced from the end of bore 268 in order to permit the fluid from line 270 to act on the end face of the valve at all times. The spring 274 located in the valve bore 268 engages the other end of the bore and the end face of land 264 to normally maintain the valve in the position illustrated where the pump pressure line 238 is connected via the space between the valve lands 264-266 to the servo motor supply line 276 which delivers oil to both the servo motors 180. These servo motors which control the two-speed transmission are shown in Fig. 2 mounted in the clutch transmission housing 10 located forward of the normal transmission housing 186. With the relay valve 260 in the normal position under the influence of spring 274, the exhaust line 276 is blocked by the land 264. The secondary exhaust line 278 merely permits the escape of fluid trapped behind the land 264. The hydraulic system may be actuated by energizing the solenoid valve by a manually controlled switch 280 which may be attached to the gear shift control lever 282 or recessed within the control arm so that merely a button protrudes. One terminal of switch 280 is connected by a branch of line 284 to the battery 286 which is connected to ground. The other terminal of switch 280 is connected by line 288 to one terminal of the solenoid valve and the other terminal of the solenoid valve being connected to ground. When the switch 280 is closed the valve solenoid is energized. The solenoid valve may also be energized by the control for the throttle valve. The battery 286 is also connected by a branch of line 284 to one terminal of switch 296 and the other terminal is connected by a branch of line 288 to the solenoid coil 244. When the throttle pedal 290 is in the coast position as normally urged by a spring 292 the linkage 294 closes the switch 296 to complete the circuit via line 284 from the battery and via line 288 to energize the solenoid valve. When the solenoid is energized by closing either the manual switch 280 or the accelerator pedal controlled switch 296 the solenoid valve opens relay valve 260 to supply fluid under pressure to servo 180 to release brake 140 and change the transmission ratio from overdrive to direct drive.

A modified guide 231 for the brake apply rod 162 and an abutment for the brake apply spring 158 is illustrated in Fig. 6. The guide 231 has an external thread fitting the threaded aperture 232 in the housing 10 and a head 235 having a suitable form, such as; square or slotted to rotate the guide to adjust its position. The lock nut 237 holds the guide to properly position spring seat portion 239 and to locate bore 241 to guide rod 162. A split ring 243 in the bore 241 retains the rod in the bore.

The clutch and two-speed transmission assembly located in the housing 10 is normally mounted between the engine and a conventional manual transmission 186. The drive is transmitted from the engine shaft 16 to flywheel 24 which carries the clutch driving plates. The main clutch driven plates 50—52 are directly connected to the engine by the engagement of the clutch plates under the action of the clutch spring 87. The foot pedal actuated control shaft 112 acting through the fork 110 and a throwout bearing 96 will move to the left as illustrated in Fig. 1 to disengage the clutch. Normally, when the clutch pedal is not depressed, the engaging spring 87 holds the clutch in engaged position. The clutch driven plates are connected to drive the carrier assembly 58 having the planetary pinions 62. Pinions 62 mesh externally with the ring gear fixed to the output shaft 72 and internally with the sun gear 66. A one-way sprag clutch 134 located between the sun gear sleeve shaft 106 and the output shaft 72 prevents the sun gear sleeve shaft from overrunning the output shaft 72 for direct drive, when this gear set is transmitting power from the engine to the output shaft 72. When the vehicle is overrunning the engine and the output shaft 72 is rotating faster than the sun gear sleeve shaft 130, the one-way sprag clutch 134 permits gears free-wheeling. An overdrive is provided by locking the sun gear 66 to the housing by means of the brake 140. As best illustrated in Fig. 2, the brake is actuated by a rotary cam 148 having diametrically opposed ears 152 engaged by a spring actuated rod 162 to apply the brake and the hydraulic servo actuated rod 176 to release the brake. Brake 140 is normally engaged by the spring 158 and disengaged by the servo motor 180 when fluid flowing through pipe 276 moves the piston 178. The brake 140 will also be disengaged when the main clutch is disengaged by the mechanical linkage, consisting of the lever 212 and the rod 220, connecting the shaft 112 to the ear 152 of brake cam 144. It will be noted that the rod 220 has an elongated slot 216 to provide a lost motion connection between the rod and the lever 212 so that the shaft 112 and the clutch is not moved when the spring 158 and servo 180 engage and disengage the brake 140.

When the main clutch 50—52 is operated by depressing the clutch pedal to rotate shaft 112, the clutch actuating fork 110 moves the clutch throwout bearing 96 to the left as seen in Fig. 1 to release the main clutch. At the same time, the throwout bearing 96 engages the synchronizing brake or ground clutch spring 128 which moves the sleeve 106 forwardly under the spring pressure until the cone faces 124—126 engage each other. The synchronizing sleeve has flats 108 on each side which interengage with the main clutch fork tines to prevent rotation of the synchronizing sleeve 106. Thus when this non-rotatable sleeve having friction face 124 thereon engages friction face 126 on the carrier rotation is retarded and the carrier moves forward to engage the friction face on shoe 80 of the carrier 78 and a friction face 81 on the annular ring gear support member 68. The friction engagement of the cone surfaces 124—126 and the friction surfaces 80—81 act as a synchronizing brake to retard or stop the rotary movement of these elements and particularly of shaft 72 which is not only an output shaft of the two-speed transmission, but the input shaft to the main transmission. Since synchronizing clutches are not ordinarily provided on the first and second gears of sliding gear transmissions, it is necessary to employ this synchronizing mechanism to quickly slow down or stop the input shaft 72. The additional weight of the two-speed transmission gear mounted on this shaft would cause the input shaft 72 to rotate too long or too fast to permit proper shifting of the main transmission.

Fig. 4 illustrates the transmission control schematically with the transmission in direct drive. The transmission is in direct drive when both the manual switch 280 located on the gear shift lever 282 is open and the throttle pedal control is not at zero throttle and switch 296 is open. When both switches are opened the solenoid 244 is deenergized so that the spring 250 holds the valve element 248 in engagement with the seat 252 closing the line 234 from the pump. Then the spring 274 holds the relay valve 262 in the right hand position. The spring chamber of relay valve 260 is connected to exhaust by line 278 and the chamber at the outer face of land 266 is also exhausted through line 270 connected through valve chamber 242 and the line 258 to the sump. The fluid under pressure from the engine driven pump 230 is then connected via line 238 to the space between the lands 264—266 of relay valve 260 and via the line 276 and its branches to the servo motors 180 to counteract the brake apply spring 158 and rotate cam 148 to release the brake 140 for direct drive. In direct drive the power is transmitted from the engine through the main clutch to the planet pinion carrier to the sun gear 66 and ring gear 64. The load on the ring gear 64 and the output shaft connected thereto tends to cause the sun gear 66 to rotate faster than the output shaft. Since the sprag 134 prevents the sun gear 66 from rotating faster than the output shaft 72, the sun gear and ring gear are locked together and the planetary unit is in direct drive.

When the vehicle overruns the engine so as to transmit power from the rear wheels through the transmission to the engine, the two-speed transmission output shaft 72 will drive the planetary transmission ring gear 64 and cause the sun gear 66 to rotate in reverse direction in respect to the output shaft 72. This reverse rotation will be permitted by the sprag clutch 134 to effect a disconnection and free-wheeling when the transmission is in direct drive.

The transmission may be placed in overdrive by closing the switch 280 on the gearshift lever 282 or by completely releasing the throttle pedal 290 to close the engine throttle which will close switch 296. Since these switches are connected in parallel with a suitable source of power such as the battery 286 to energize the solenoid valve 236, the actuation of either of these switches or both of these switches will actuate the solenoid valve and move the core element 246 to open the pump output line 234 to the valve chamber 242 and to close the sump line 258 to connect the fluid under pressure from the engine driven pump 230 via line 234 through the solenoid valve body 242 and line 270 to relay valve 240. The fluid will act against the end face of land 266 to move valve element 262 against the spring 274 to close line 238 from the main pump and to connect the servo motors 180 via line 276 to the exhaust line 278 to the sump. When the servo motors 180 are exhausted in this manner, the brake apply spring 158 rotates the brake apply cam 148 to engage the brake 140 and hold sun gear 66 to place the two-speed transmission unit in overdrive.

A vehicle employing the applicant's main clutch and two-speed transmission unit and the conventional four-speed manual transmission would be operated in a manner similar to the conventional four-speed transmission of the synchromesh or manual shift type and would provide eight speed ranges. In starting the vehicle from rest, the main clutch pedal is depressed to disengage the main clutch 50—52 from the engine and the shift lever 282 is shifted into first to shift the main transmission 186 into first gear. The switch 280 is open and, since the accelerator will not be in zero throttle position, the switch 296 will be open so that the solenoid valve will be deenergized permitting the pump to supply the fluid to servo motors 180 to place the transmission in direct drive. The clutch pedal is then let in to engage clutch 50—52 in the conventional manner to start the vehicle in first speed which consists of the first in the main transmission and direct in the two-speed transmission unit. When the vehicle has accelerated sufficiently in first speed, the operator of the vehicle will manually close the switch 280 to shift the two-speed transmission into overdrive which, in combination with first in the main transmission, provides second speed. When the speed of the vehicle increases so that a shift to third is desirable, the operator depresses the clutch pedal to disconnect the main clutch and through the brake linkage shift the transmission unit to direct and simultaneously moves the shift lever 282 to second speed and depress switch button 280 with a finger to disconnect the solenoid and hydraulically hold the two-speed transmission unit in direct. This places the vehicle into the third speed which comprises second speed of the main transmission unit and direct in the two-speed transmission unit. The shift to fourth speed when desired is accomplished by merely closing switch 280 and shifting the two-speed transmission unit to overdrive. Shift to fifth speed is accomplished in the same manner as the shift to third by shifting the main transmission to third and the two-speed transmission to direct. Then sixth speed is obtained by closing switch 280 to shift the two-speed transmission unit to overdrive. Seventh and eighth may be obtained in the same manner.

As pointed out above, the two-speed transmission unit will freewheel when in direct drive. Since this transmission arrangement is intended for trucks and buses where it is not desirable to coast, a switch 296 is connected to the throttle to energize the solenoid valve and thus shift the transmission to overdrive where there is no freewheeling when the throttle is in zero throttle position. If there is a failure of the fluid supply for controlling the two-speed transmission unit for any reason such as engine failure, the spring 158 engages the brake to place the two-speed transmission unit in overdrive which provides a positive gear connection without freewheeling action.

Since trucks are generally parked in a low forward gear, such as second, to provide additional safety braking means, the transmission arrangement must also enable the main clutch to free the output shaft 72 or input shaft of the main transmission so that the main transmission can be shifted under load from second to neutral in order to move the vehicle or start the engine.

This shift must be made when the engine is not running and there is no oil supply for the two-speed transmission unit. The spring engages the brake 140 to hold the sun gear 66 in fixed position. The one-way sprag clutch 134 located between the two-speed transmission output shaft 72 and the sun gear sleeve shaft 130 will permit the shaft 72 to rotate clockwise (arrow a Fig. 1) with respect to the sun gear sleeve shaft as it will when the vehicle rolls forward in gear. Thus when the vehicle is on a downward incline the release of the main clutch 50—52 will permit the vehicle to roll forward and remove the load on the shaft 272 and the main transmission gearing to permit the main transmission 186 to be shifted manually into neutral. However when the vehicle is on an upwardly extending incline where the vehicle tends to roll backward and the shaft 72 to turn counterclockwise, the shaft 72 is held by the sprag clutch 134 to the sun gear sleeve which is fixed to the housing by brake 140. Though it would be possible with the main clutch released to start the engine and employ the hydraulic pressure to release the brake 140, it is desirable in truck and bus operations to shift the main transmission under these conditions from second gear to neutral in order to permit the vehicle to roll backward. Thus in order to release the sun gear 106 without starting the engine, the main clutch operating shaft 112 is connected to the brake apply ring 148 by a linkage consisting of the lever 212 and the arm 220 so that whenever the main clutch is released, the brake 140 will also be released if it is not already released by the hydraulic actuation mechanism.

Since the overdrive gear unit provides freewheeling in the direct drive ratio and does not provide freewheeling in the overdrive ratio, the ratio change brake is normally engaged by springs 158 to place the transmission in overdrive ratio. Thus whenever the engine is stopped the engine is directly connected without freewheeling to the rear wheels to permit a push start and to hold the vehicle in gear on a hill.

The above described preferred embodiment is illustrative of the invention and it will be understood that many modifications may be made within the scope of the appended claims.

I claim:

1. In a transmission assembly, a housing, a drive and a driven shaft, a main clutch having a driving member rotatably connected with said drive shaft and a driven member, main clutch control means movable to engage and to disengage said clutch, a planetary gear set having a ring gear element, a sun gear element and a carrier element including planet pinions meshing with the ring and sun gear elements, one element of said planetary gear set being connected to said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, ratio control means connected to said ratio change means to normally position said ratio change means in said one or another position, and overcontrol means connected to and controlled by said main clutch control means to overrule said ratio control means to position said ratio change means in one of said positions regardless of the position being maintained by said ratio control means.

2. In a transmission assembly, a housing, a drive and a driven shaft, a main clutch having a driving member rotatably connected with said drive shaft and a driven member, main clutch control means movable to engage and to disengage said clutch, a planetary gear set having a ring gear element, and a sun gear element and a carrier element including planet pinions meshing with the ring and sun gear elements, one element of said planetary gear set being connected to said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, ratio control means connected to said ratio change means to normally control said ratio change means to position said ratio change means in said one or said another position and a second ratio control means connected to said main clutch control means and effective when said main clutch control means disengages said main clutch to overcontrol said ratio control means and position said ratio change means in said one speed ratio position to free said third element.

3. In a transmission assembly, a housing, a drive and a driven shaft, a main clutch having a driving member rotatably connected with said drive shaft and a driven member, main clutch control means movable to engage and to disengage said clutch, a planetary gear set having a ring gear element, a sun gear element and a carrier element including planet pinions meshing with the ring and sun gear elements, one element of said planetary gear set being connected to said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, ratio control means connected to said ratio change means to control said ratio change means, and means controlled by said main clutch control means moving to disengage said clutch and to stop rotation of said second element of said planetary gear set including said driven shaft.

4. In a transmission assembly, a housing, a drive and a driven shaft, a main clutch having a driving member rotatably connected with said drive shaft and a driven member, main clutch control means movable to engage and disengage said clutch, a planetary gear set having a ring gear element, a sun gear element and a carrier element including planet pinions meshing with the ring and sun gear elements, one element of said planetary gear set being connected to the said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, ratio control means connected to said ratio change means to control said ratio change means, and said main clutch control having a non-rotatable portion including synchronizing means moving during disengaging movement of said main clutch control to engage one of said elements of said planetary gear set to stop said one element of said planetary gear set, said synchronizing means axially moving said one element of said planetary gear set to engage another element of said planetary gear set to lock said planetary gear set and said driven shaft.

5. In a transmission assembly, a housing, a drive and a driven shaft, a main clutch having a driving member rotatably connected with said drive shaft and a driven member, main clutch control means movable to engage and to disengage said clutch, a planetary gear set having a ring gear element, a sun gear element and a carrier element including planet pinions meshing with the ring and sun gear elements, one element of said planetary gear set being connected to said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, ratio control means connected to said ratio change means to normally control said ratio change means, a second ratio control means controlled by said main clutch over control means to control said ratio control means to hold said ratio change means in one of said positions, and means actuated by said main clutch control means moving to disengage said clutch to stop rotation of said second element of said planetary gear set including the driven shaft.

6. In a transmission assembly, a housing, a drive and driven shaft, a main clutch having a driving member rotatably connected with said drive shaft and a driven member, main clutch control means movable to engage and to disengage said clutch, a planetary gear set having a ring gear element, a sun gear element and a carrier element including planet pinions meshing with the ring and sun gear elements, one element of said planetary gear set being connected to said clutch driven member, a second element of said planetary gear set connected to said driven shaft, ratio change means including means operable in one position to connect two elements of said planetary gear set to provide one speed ratio and further means operable in another position to connect a third element and said housing to hold said third element stationary to provide another speed ratio, first ratio control means connected to said ratio change means to control said ratio change means, a second ratio control means connected to said main clutch control means and effective when said main clutch control means disengages said main clutch to overcontrol said first control means to free said third element to provide said one speed ratio, and said main clutch control means having a non-rotatable portion including synchronizing means moving during disengaging movement of said main clutch control to engage one of said elements of said planetary gear set to stop said one element of said planetary gear set, said synchronizing means axially moving said one element of said planetary gear set to engage another element of said planetary gear set to lock said planetary gear set including said driven shaft.

7. In an engine and transmission assembly, a throttle control for an engine having a coast position and a range of fuel supply positions, a housing, a drive shaft, a main clutch having a driving member rotatably connected with said drive shaft and a driven member, main clutch control means movable to engage and to disengage said clutch, a planetary gear set having a ring gear element, and a sun gear element and a carrier element including planet pinions meshing with the ring and sun gear elements, one element of said planetary gear set being connected to said clutch driven member, a second element of said planetary gear set including the driven element of said transmission, clutch and brake means operable to connect two elements of said planetary gear set to provide one speed ratio and to connect a third element and said housing to hold said third element stationary to provide another speed ratio, first ratio control means connected to said clutch and brake means to control said clutch and brake means to obtain either speed ratio, and a second ratio control means connected to said clutch and brake means and said throttle and is controlled by said throttle in said coast position to actuate said clutch and brake means to provide said another speed ratio.

8. In a transmission assembly, a housing, a drive shaft, a main clutch having an annular driving member rotatably connected with said drive shaft and an annular driven member, main clutch control means movable to engage and to disengage said main clutch, a planetary gear set mounted concentrically within said annular driving and driven members of said clutch and having a ring gear element, a sun gear element, and a carrier element including planetary pinions meshing with said ring and sun gear elements, one element of said planetary gear set being connected to said clutch driven member, a second element of said planetary gear set including the driven element of said transmission, ratio change means including means operable in one position to connect two elements of said planetary gear set to provide one speed ratio and further means operable in another position to connect a third element and said housing to hold said third element stationary to provide another speed ratio, ratio control means connected to said ratio change means to control said clutch and brake means, and said ratio change means including a ratio change clutch and a brake with said ratio change clutch and brake located concentrically one within the other and about said driven element.

9. In a transmission assembly, a housing, a drive shaft, a main clutch having an annular driving member rotatably connected with said drive shaft and an annular driven member, main clutch control means movable to engage and to disengage said main clutch, a planetary gear set mounted concentrically within said annular driving and driven members of said clutch and having a ring gear element, a sun gear element, and a carrier element including planetary pinions meshing with said sun and ring gear elements, one element of said planetary gear set being connected to said clutch driven member, a second element of said planetary gear set including the driven element of said transmission, ratio change means including means operable in one position to connect two elements of said planetary gear set to provide one speed ratio and further means operable in another position to connect a third element and said housing to hold said third element stationary to provide another speed ratio, ratio control means connected to said ratio change means to control said ratio change means, said ratio change means including ratio change clutch and a brake with said ratio change clutch and brake located concentrically one within the other and about said driven element and said ratio change means being axially spaced from said main clutch and planetary gear set sufficiently to provide a space for said main clutch control means and said ratio control means.

10. In a transmission assembly for an engine, a throttle movable from a coast position through a range of fuel supply positions, a drive shaft, a driven shaft, a clutch having a driving member rotatably connected with said drive shaft and a driven member, clutch control means movable to engage and to disengage said clutch, a planetary gear set mounted on said driven shaft having a ring gear element, a sun gear element, and a carrier element including planetary pinions meshing with said sun and ring gear elements, one element of said planetary gear set being connected to said clutch driven member, a second element of said planetary gear set being connected to said driven shaft, a one-way clutch located between the third element of said planetary gear set and said driven shaft to prevent said third element overrunning said driven shaft in a forward direction to provide one speed ratio, brake means connected to said third element to hold said third element stationary to provide another speed ratio, brake control means connected to said brake means to engage and disengage said brake means, manual means to actuate said brake control means, throttle controlled means to actuate said brake control means to disengage said brake when said throttle is in coast position and to permit engagement of said brake control means through said range of fuel supply positions.

11. In a transmission assembly, a drive shaft, a driven shaft, a main clutch having a driving member rotatably connected with said drive shaft and a driven member, main clutch control means movable to engage and to disengage said clutch, a planetary gear set mounted on said driven shaft having a ring gear element, a sun gear element, and a carrier element including planetary pinions meshing with said ring and sun gear elements, one element of said planetary gear set being connected to said clutch driven member, a second element of said planetary gear set being connected to said driven shaft, a one-way clutch located between the third element of said planetary gear set and said driven shaft to prevent said third element overrunning said driven shaft in a forward direction to lock said planetary gear set to provide one speed ratio, brake means connected to said third element to hold said third element stationary to provide another speed ratio, and brake control means connected to said brake means to normally actuate said brake means, a second brake control means connected to and actuated by said main clutch control means to effect the release of said brake when said brake is engaged and ineffective when said brake is not engaged.

12. In a transmission assembly, a drive shaft, a driven shaft, a clutch having a driving member rotatably connected with said drive shaft and a driven member, clutch control means movable to engage and to disengage said clutch, a planetary gear set mounted on said driven shaft having a ring gear element, a sun gear element, and a carrier element including planetary pinions meshing with said ring and sun gear elements, one element of said planetary gear set being connected to said clutch driven member, a second element of said planetary gear set being connected to said driven shaft, a one-way clutch located between the third element of said planetary gear set and said driven shaft to prevent said third element overrunning said driven shaft in a forward direction to lock said planetary gear set to provide one speed ratio, brake means connected to said third element to hold said third element stationary to provide another speed ratio, and brake control means connected to said brake means to actuate said brake means, and synchronizing means actuated by said main clutch control means moving to disengage said clutch to stop rotation of said driven shaft.

13. In a transmission assembly, a drive shaft, a driven shaft, a main clutch having a driving member rotatably connected with said drive shaft and a driven member, main clutch control means movable to engage and to disengage said clutch, a planetary gear set mounted on said driven shaft having a ring gear element, a sun gear element, and a carrier element including planetary pinions meshing with said ring and sun gear elements, one element of said planetary gear set being connected to said clutch driven member, a second element of said planetary gear set being connected to said driven shaft, a one-way clutch located between the third element of said planetary gear set and said driven shaft to prevent said third element overrunning said driven shaft in a forward direction to lock said planetary gear set to provide one speed ratio, brake means connected to said third element to hold said third element stationary to provide another speed ratio, and brake control means connected to said brake means to actuate said brake means, a second brake control means actuated by said main clutch control means to effect the release of said brake if said brake is engaged and ineffective if said brake is not engaged and synchronizing means actuated by said main clutch control means moving to disengage said clutch to stop rotation of said driven shaft.

14. In a transmission assembly, a drive shaft, a driven shaft, a planetary gear set mounted on said driven shaft having a carrier, pinions mounted on said carrier, a ring gear meshing with said pinions connected to said driven shaft, and a sun gear meshing with said pinions and rotatably mounted on said driven shaft, a sun gear sleeve connected to said sun gear, a main clutch to connect and disconnect said drive shaft and said carrier, a one-way clutch located between said sun gear sleeve and said driven shaft to prevent said sun gear overrunning said driven shaft in a forward direction to provide one speed ratio, brake means connected to said sun gear sleeve to hold said sun gear stationary to provide another speed ratio, main clutch control means to connect or disconnect said main clutch including a throwout bearing sleeve non-rotatably and axially slidably mounted on said sun gear sleeve between said planetary gear set and said brake means, and synchronizing means including friction elements on said throwout bearing sleeve and said carrier which are engaged when said main clutch control disengages said main clutch.

15. In a transmission assembly, a drive shaft, a driven shaft, a planetary gear set mounted on said driven shaft having a carrier, pinions mounted on said carrier, a ring gear meshing with said pinions connected to said driven shaft, and a sun gear meshing with said pinions and rotatably mounted on said driven shaft, a sun gear sleeve connected to said sun gear, a main clutch to connect and disconnect said drive shaft and said carrier, a one-way clutch located between said sun gear sleeve and said driven shaft to prevent said sun gear overrunning said driven shaft in a forward direction to provide one speed ratio, brake means connected to said sun gear sleeve to hold said sun gear stationary to provide another speed ratio, main clutch control means to connect or disconnect said main clutch including a throwout bearing sleeve non-rotatably and axially slidably mounted on said sun gear sleeve between said planetary gear set and said brake means, and means including friction elements on said throwout bearing sleeve and said carrier actuated by said clutch control means to stop the rotation of said driven shaft.

16. In a main clutch and planetary transmission assembly for connecting an engine to a sliding gear transmission, a drive shaft to be driven by the engine, a driven shaft to drive the sliding gear transmission, a main clutch having a drive member connected to said drive shaft and a driven member, main clutch control means to engage and disengage said main clutch, a planetary transmission connecting said driven member and said driven shaft providing a plurality of drive ratios and including an element, holding means to hold said element stationary to provide one ratio and one-way drive means to connect said element to said driven shaft to provide another ratio, transmission control means connected to and normally actuating said holding means, and means connecting said main clutch control means to said holding means to disengage said holding means when said main clutch is disengaged to free said driven shaft for rotation in either direction to permit shifting of the sliding gear transmission.

17. In a main clutch and auxiliary transmission assembly for connecting an engine to a main sliding gear transmission, a drive shaft to be driven by the engine, a driven shaft to drive the main sliding gear transmission, a synchronizing element connected to said driven shaft, a main clutch having a drive member connected to said drive shaft and a driven member, main clutch control linkage including a linkage member to engage and disengage said main clutch, an auxiliary transmission connecting said driven member and said driven shaft providing a plurality of drive ratios, transmission control means connected to and controlling said auxiliary transmission to provide one or another of said ratios, and a sleeve surrounding said driven shaft controlled by said main clutch control linkage for nonrotatable axial movement to engage said synchronizing element when said main clutch is disengaged to frictionally retard and stop rotation of said driven shaft and to permit rotation under load to permit shifting of the sliding gear transmission.

18. In a main clutch and planetary transmission assembly for connecting an engine to a sliding gear transmission, a drive shaft to be driven by the engine, a driven shaft to drive the sliding gear transmission, a main clutch having a drive member connected to said drive shaft and a driven member, main clutch control means to engage and disengage said main clutch, planetary transmission means connecting said driven member and said driven shaft providing a plurality of drive ratios and including an element, holding means to hold said element stationary to provide one ratio, one-way drive means to connect said element to said driven shaft to provide another ratio, and means including said holding means and said one way drive means operative when said holding means is engaged to prevent rotation of said driven shaft in one direction and operative when said holding means is disengaged to permit rotation of said driven shaft in both directions, transmission control means connected to and normally controlling said holding means, means connecting said main clutch control means to said holding means to disengage said holding means when said main clutch is disengaged to free said driven shaft for rotation in both direction under load to permit shifting of the sliding gear transmission and means controlled by said main clutch control means to frictionally retard and stop said driven shaft when unloaded and to permit rotation when under load to permit shifting of the sliding gear transmission.

19. In a transmission assembly, a drive shaft, a driven shaft, a clutch having a driving member centrally secured to said drive shaft and an annular friction surface, an annular driven member engageable with said friction surface, an annular pressure plate supported for axial movement on said driving member, and a control member engaging said driving member and said pressure plate, said annular friction surface and said pressure plate having a large internal diameter, a planetary gear set mounted on said driven shaft concentrically within said annular driven member and pressure plate and axially between said driving member and said control member and having a ring gear element, a sun gear element, and a carrier element including planetary pinions meshing with said sun and ring gear elements, one element of said planetary gear set being connected to said clutch driven member, a second element of said planetary gear set being connected to said driven shaft, a one-way clutch located between the third element of said planetary gear set and said driven shaft to prevent said third element overrunning said driven shaft in a forward direction to lock said planetary gear set to provide one speed ratio, brake means connected by a sleeve shaft to said third element to hold said third element stationary to provide another speed ratio, and brake control means connected to said brake means to actuate said brake means, said clutch control member extending inwardly to a point adjacent said sleeve shaft, and clutch control means mounted on said sleeve shaft and axially slidable thereon to actuate said control member to engage and disengage said clutch.

20. In a main clutch and planetary transmission assembly for connecting an engine to a sliding gear transmission, a drive shaft to be driven by the engine, a driven shaft to drive the sliding gear transmission, a main clutch having a drive member connected to said drive shaft and a driven member, main clutch control means to engage and disengage said main clutch, planetary transmission means connecting said driven member and said driven shaft providing a plurality of drive ratios and including an element, holding means to hold said element stationary to provide a two-way drive in one ratio, one-way drive means to connect said element to said driven shaft when said holding means is released to provide a one-way drive in another ratio, and means including said holding means and said one way drive means operative when said holding means is engaged to prevent rotation of said driven shaft in one direction and operative when said holding means is disengaged to permit rotation of said driven shaft in both directions, transmission control means connected to and normally actuating said holding means, and means connecting said main clutch control means to said holding means to disengage said holding means when said main clutch is disengaged to free said driven shaft for rotation in both directions to permit shifting of the sliding gear transmission.

21. In a main clutch and planetary transmission assembly for connecting an engine to a sliding gear transmission, a housing, a drive shaft to be driven by the engine, a driven shaft to drive the sliding gear transmission, a main clutch having a drive member connected to said drive shaft and a driven member, main clutch control means to engage and disengage said main clutch, transmission means connecting said driven member and said driven shaft providing a first ratio in which said driven shaft is held against rotation with respect to said housing in at least one direction and a second ratio in which said driven shaft is free of said housing for rotation in both directions, transmission control means connected to and controlling said transmission to selectively provide said first and second ratios, and means connecting said main clutch control means to said transmission control means to effect engagement of said second ratio when said main clutch control is effective to disengage said main clutch to free said driven shaft for rotation in either direction to permit shifting of the sliding gear transmission.

22. In a main clutch and transmission assembly, a drive shaft to be driven by the engine, a driven shaft to drive the main sliding gear transmission, a main clutch having a drive member connected to said drive shaft and a driven member, main clutch control means to engage and disengage said main clutch, transmission means connecting said driven member and said driven shaft and providing a two-way drive in a first ratio and a one-way drive in a second ratio from said driven member to said driven shaft, transmission control means connected to and controlling said transmission means to selectively provide said first and second ratios, and means connecting said main clutch control means to said transmission to effect engagement of said second ratio regardless of the position of said transmission control means when said main clutch control means is effective to disengage said main clutch to free said driven shaft for rotation.

23. In a main clutch and transmission assembly, a drive shaft to be driven by the engine, a driven shaft to drive the main sliding gear transmission, a main clutch having a drive member connected to said drive shaft and a driven member, main clutch control means to engage and disengage said main clutch, transmission means connecting said driven member and said driven shaft and providing a first ratio and a second ratio between said driven member and said driven shaft, transmission control means connected to and controlling said transmission means to selectively provide said first and second ratios, and means connecting said main clutch control means to said transmission control means to effect engagement of said second ratio regardless of the selected position of said transmission control means when said main clutch control means is effective to disengage said main clutch.

24. The invention defined in claim 23, and means effective when said main clutch control is effective to disengage said main clutch to frictionally retard and stop said driven shaft.

25. In an engine and transmission assembly, a fuel control for an engine having a coast position and a normal range of fuel supplied positions, a drive shaft driven by the engine, a driven shaft, a main clutch having a drive member connected to said drive shaft and a driven member, main clutch control means to engage and disengage said main clutch, transmission means connecting said driven member and said driven shaft and providing a two way drive in a first ratio and a one-way drive in a second ratio from said driven member to said driven shaft, transmission control means connected to and controlling said transmission means to selectively provide said first and second ratios, and means operative when said fuel control is in said coast position to control said transmission to effect engagement of said second ratio regardless of the position of said transmission control means and when said fuel control is in said normal range of fuel supply positions to permit control of said transmission by said transmission control means to effect engagement of said first and second ratios.

26. In a transmission assembly, a drive shaft, a driven shaft, a clutch having a driving member centrally secured to said drive shaft and an annular friction surface, an annular driven member engageable with said friction surface, an annular pressure plate supported for axial movement on said driving member, and a control member engaging said driving member and said pressure plate, said annular friction surface and said pressure plate having a large internal diameter, a planetary gear set mounted on said driven shaft concentrically within said annular driven member and pressure plate and axially between said driving member and said control member and having a ring gear element, a sun gear element, and a carrier element including planetary pinions meshing with said sun and ring gear elements, one element of said planetary gear set being connected to said clutch driven member, a second element of said planetary gear set being connected to said driven shaft, a ratio clutch located between the third element of said planetary gear set and said driven shaft to connect said third element and said driven shaft to lock said planetary gear set to provide one speed ratio, brake means connected by a sleeve shaft to said third element to hold said third element stationary to provide another speed ratio, and brake control means connected to said brake means to actuate said brake means, said clutch control member extending inwardly to a point adjacent said sleeve shaft, and clutch control means mounted on said sleeve shaft and axially slidable thereon to actuate said control member to engage and disengage said clutch.

27. In a transmission assembly, a drive shaft, a driven shaft, a clutch having a driving member centrally secured to said drive shaft and an annular friction surface, an annular driven member engageable with said friction surface, an annular pressure plate supported for axial movement on said driving member, and an annular control member engaging said driving member and said pressure plate, said annular friction surface and said pressure plate having a large internal diameter, a planetary gear set mounted on said driven shaft concentrically within said annular driven member and pressure plate and axially between said driving member and said control member and having a ring gear element, a sun gear element, and a carrier element including planetary pinions meshing with said sun and ring gear elements, one element of said planetary gear set being connected to said clutch driven member, a second element of said planetary gear set being connected to said driven shaft, a ratio clutch located between the third element of said planetary gear set and said driven shaft to connect said third element and said driven shaft to lock said planetary gear set to provide one speed ratio, brake means connected by a sleeve shaft to said third element to hold said third element stationary to provide another speed ratio, and brake control means connected to said brake means to actuate said brake means, said clutch control member being located between said planetary gear set and said brake means and extending inwardly to a point adjacent said sleeve shaft, and clutch control means mounted on said sleeve shaft and axially slidable thereon to actuate said control member to engage and disengage said clutch.

28. In a transmission assembly, a drive shaft, a driven shaft, a clutch having a driving member centrally secured to said drive shaft and an annular friction surface, an annular driven member engageable with said friction surface, an annular pressure plate supported for axial movement on said driving member, and a control member engaging said driving member and said pressure plate, said annular friction surface and said pressure plate having a large internal diameter, a planetary gear set mounted on said driven shaft concentrically within said annular driven member and pressure plate and axially between said driving member and said control member and having a ring gear, a sun gear, and a carrier including planetary pinions meshing with said sun and ring gears, said carrier being connected to said clutch driven member, said ring gear being connected to said driven shaft, a ratio clutch located between said sun gear and said driven shaft to connect said sun gear to said driven shaft to lock said planetary gear set to provide one speed ratio, brake means connected by a sleeve shaft to said sun gear to hold said sun gear stationary to provide another speed ratio, and brake control means connected to said brake means to actuate said brake means, said clutch control member extending inwardly to a point adjacent said sleeve shaft, and clutch control means mounted on said sleeve shaft and axially slidable thereon to actuate said control member to engage and disengage said clutch.

References Cited in the file of this patent

UNITED STATES PATENTS

| | | |
|---|---|---|
| 2,063,444 | Lambert | Dec. 8, 1936 |
| 2,177,872 | Dunn | Oct. 31, 1939 |
| 2,524,975 | Hobbs | Oct. 10, 1950 |
| 2,590,089 | Cook | Mar. 25, 1952 |
| 2,599,773 | Heracher et al. | June 10, 1952 |
| 2,635,480 | Maurer et al. | Apr. 21, 1953 |
| 2,658,412 | Kelbel | Nov. 10, 1953 |
| 2,681,579 | Maurice | June 22, 1954 |
| 2,743,626 | Schjolin | May 1, 1956 |

FOREIGN PATENTS

| | | |
|---|---|---|
| 388,244 | Great Britain | Feb. 23, 1933 |
| 675,441 | Great Britain | July 9, 1952 |

UNITED STATES PATENT OFFICE

CERTIFICATE OF CORRECTION

Patent No. 2,861,482 November 25, 1958

Hans O. Schjolin

It is hereby certified that error appears in the printed specification of the above numbered patent requiring correction and that the said Letters Patent should read as corrected below.

Column 4, line 7, for "48" read -- 148 --; column 11, line 62, for "clutch and brake" read -- ratio change --.

Signed and sealed this 7th day of April 1959.

(SEAL)
Attest:

KARL H. AXLINE
Attesting Officer

ROBERT C. WATSON
Commissioner of Patents